(12) United States Patent
Labuda et al.

(10) Patent No.: US 8,856,178 B2
(45) Date of Patent: Oct. 7, 2014

(54) COMMITTING EVENTS WHERE TRANSACTION THREADS HAVE READ-ONLY ACCESS TO SHARED MEMORY

(75) Inventors: David S. Labuda, Los Altos Hills, CA (US); Jayaprakash Krishnamoorthy, Cupertino, CA (US)

(73) Assignee: Oracle International Corporation, Redwood Shores, CA (US)

( * ) Notice: Subject to any disclaimer, the term of this patent is extended or adjusted under 35 U.S.C. 154(b) by 75 days.

(21) Appl. No.: 13/303,504

(22) Filed: Nov. 23, 2011

(65) Prior Publication Data

US 2012/0084253 A1    Apr. 5, 2012

Related U.S. Application Data

(62) Division of application No. 10/394,409, filed on Mar. 21, 2003, now Pat. No. 8,099,393.

(60) Provisional application No. 60/366,827, filed on Mar. 22, 2002.

(51) Int. Cl.
*G06F 17/30* (2006.01)
*H04M 15/00* (2006.01)
*H04L 12/14* (2006.01)

(52) U.S. Cl.
CPC ............. *H04L 12/14* (2013.01); *H04M 15/725* (2013.01); *H04M 15/74* (2013.01); *H04L 12/1428* (2013.01); *H04M 15/43* (2013.01); *H04M 15/59* (2013.01); *H04M 15/70* (2013.01); *H04M 15/44* (2013.01); *H04M 15/00* (2013.01)
USPC .......................................... 707/792; 455/406

(58) Field of Classification Search
CPC .............. G06F 17/30289; H04W 4/24; H04M 2215/32

USPC .......................................... 707/792; 455/406
See application file for complete search history.

(56) References Cited

U.S. PATENT DOCUMENTS

| 4,430,530 A | 2/1984 | Kandell et al. |
| 4,831,582 A | 5/1989 | Miller et al. |

(Continued)

FOREIGN PATENT DOCUMENTS

| EP | 0063402 A1 | 7/1982 |
| WO | WO 95/04960 A2 | 2/1995 |

(Continued)

OTHER PUBLICATIONS

Jayant R. Haritsa et al., "Earliest Deadline Scheduling for Real-Time Database Systems", 1991, IEEE, pp. 232-242.*

(Continued)

*Primary Examiner* — Rehana Perveen
*Assistant Examiner* — Scott A Waldron
(74) *Attorney, Agent, or Firm* — Kilpatrick Townsend & Stockton LLP

(57) ABSTRACT

According to one embodiment, a computer system can execute a plurality of threads in parallel. Each thread can process an event in real-time and each event can pertain to a customer transaction. Read-only data can be accessed from a shared memory of an in-memory database. The read-only data can comprise information needed to rate the customer transaction to which the event pertains. Information regarding the processed event can be sent to a commit engine. The commit engine can be configured to update the shared memory according to the processed event, log the information regarding the processed event to a storage device, and store updates to the shared memory in a memory local to the thread.

11 Claims, 12 Drawing Sheets

(56) References Cited

U.S. PATENT DOCUMENTS

| | | |
|---|---|---|
| 4,849,884 A | 7/1989 | Axelrod et al. |
| 4,868,743 A | 9/1989 | Nishio |
| 4,918,593 A | 4/1990 | Huber |
| 4,968,873 A | 11/1990 | Dethloff et al. |
| 5,006,978 A | 4/1991 | Neches |
| 5,010,485 A | 4/1991 | Bigari |
| 5,036,389 A | 7/1991 | Morales |
| 5,043,872 A | 8/1991 | Cheng et al. |
| 5,163,148 A | 11/1992 | Walls |
| 5,212,787 A | 5/1993 | Baker et al. |
| 5,220,501 A | 6/1993 | Lawlor et al. |
| 5,224,034 A | 6/1993 | Katz et al. |
| 5,241,670 A | 8/1993 | Eastridge et al. |
| 5,291,583 A | 3/1994 | Bapat |
| 5,295,256 A | 3/1994 | Bapat |
| 5,305,389 A | 4/1994 | Palmer |
| 5,313,664 A | 5/1994 | Sugiyama et al. |
| 5,386,413 A | 1/1995 | McAuley et al. |
| 5,426,780 A | 6/1995 | Gerull et al. |
| 5,448,623 A | 9/1995 | Wiedeman et al. |
| 5,448,727 A | 9/1995 | Annevelink |
| 5,450,477 A | 9/1995 | Amarant et al. |
| 5,452,451 A | 9/1995 | Akizawa et al. |
| 5,469,497 A | 11/1995 | Pierce et al. |
| 5,475,585 A | 12/1995 | Bush |
| 5,475,838 A | 12/1995 | Fehskens et al. |
| 5,483,445 A | 1/1996 | Pickering |
| 5,495,609 A | 2/1996 | Scott |
| 5,499,371 A | 3/1996 | Henninger et al. |
| 5,504,885 A | 4/1996 | Alashqur |
| 5,506,966 A | 4/1996 | Ban |
| 5,517,555 A | 5/1996 | Amadon et al. |
| 5,523,942 A | 6/1996 | Tyler et al. |
| 5,530,853 A | 6/1996 | Schell et al. |
| 5,544,302 A | 8/1996 | Nguyen |
| 5,548,749 A | 8/1996 | Kroenke et al. |
| 5,555,444 A | 9/1996 | Diekelman |
| 5,560,005 A | 9/1996 | Hoover et al. |
| 5,579,375 A | 11/1996 | Ginter |
| 5,590,395 A | 12/1996 | Diekelman et al. |
| 5,613,012 A | 3/1997 | Hoffman et al. |
| 5,615,109 A | 3/1997 | Eder |
| 5,615,249 A | 3/1997 | Solondz |
| 5,615,362 A | 3/1997 | Jensen et al. |
| 5,627,979 A | 5/1997 | Chang et al. |
| 5,644,736 A | 7/1997 | Healy et al. |
| 5,649,118 A | 7/1997 | Carlisle et al. |
| 5,666,648 A | 9/1997 | Stuart |
| 5,677,945 A | 10/1997 | Mullins et al. |
| 5,684,965 A | 11/1997 | Pickering |
| 5,694,598 A | 12/1997 | Durand et al. |
| 5,706,516 A | 1/1998 | Chang et al. |
| 5,717,924 A | 2/1998 | Kawai |
| 5,732,400 A | 3/1998 | Mandler et al. |
| 5,737,414 A | 4/1998 | Walker et al. |
| 5,745,754 A | 4/1998 | Lagarde et al. |
| 5,765,159 A | 6/1998 | Srinivasan |
| 5,778,189 A | 7/1998 | Kimura et al. |
| 5,797,137 A | 8/1998 | Golshani et al. |
| 5,799,072 A | 8/1998 | Vulcan et al. |
| 5,799,087 A | 8/1998 | Rosen |
| 5,806,061 A | 9/1998 | Chaudhuri et al. |
| 5,809,503 A | 9/1998 | Aoshima |
| 5,815,807 A | 9/1998 | Osmani et al. |
| 5,822,747 A | 10/1998 | Graefe et al. |
| 5,832,068 A | 11/1998 | Smith |
| 5,842,220 A | 11/1998 | De Groot et al. |
| 5,845,206 A | 12/1998 | Castiel et al. |
| 5,845,274 A | 12/1998 | Chadha et al. |
| 5,850,544 A | 12/1998 | Parvathaneny et al. |
| 5,852,820 A | 12/1998 | Burrows |
| 5,854,835 A | 12/1998 | Montgomery et al. |
| 5,864,845 A | 1/1999 | Voorhees et al. |
| 5,870,473 A | 2/1999 | Boesch et al. |
| 5,870,724 A | 2/1999 | Lawlor et al. |
| 5,873,093 A | 2/1999 | Williamson et al. |
| 5,875,435 A | 2/1999 | Brown |
| 5,883,584 A | 3/1999 | Langemann et al. |
| 5,884,290 A | 3/1999 | Smorodinsky et al. |
| 5,890,202 A | 3/1999 | Tanaka |
| 5,893,108 A | 4/1999 | Srinivasan et al. |
| 5,898,762 A | 4/1999 | Katz |
| 5,909,440 A | 6/1999 | Ferguson et al. |
| 5,913,164 A | 6/1999 | Pawa et al. |
| 5,915,253 A | 6/1999 | Christiansen |
| 5,920,629 A | 7/1999 | Rosen |
| 5,924,094 A | 7/1999 | Sutter |
| 5,932,068 A | 8/1999 | Smith |
| 5,937,406 A | 8/1999 | Balabine et al. |
| 5,960,416 A | 9/1999 | Block |
| 5,963,648 A | 10/1999 | Rosen |
| 5,966,649 A | 10/1999 | Gulliford et al. |
| 5,970,417 A | 10/1999 | Toyryla et al. |
| 5,974,407 A | 10/1999 | Sacks |
| 5,974,441 A | 10/1999 | Rogers et al. |
| 5,983,223 A | 11/1999 | Perlman |
| 5,987,233 A | 11/1999 | Humphrey |
| 6,005,926 A | 12/1999 | Mashinsky |
| 6,011,795 A | 1/2000 | Varghese et al. |
| 6,012,057 A | 1/2000 | Mayer et al. |
| 6,016,341 A | 1/2000 | Lim |
| 6,021,409 A | 2/2000 | Burrows |
| 6,035,326 A | 3/2000 | Miles et al. |
| 6,047,067 A | 4/2000 | Rosen |
| 6,047,267 A | 4/2000 | Owens et al. |
| 6,047,284 A | 4/2000 | Owens et al. |
| 6,058,173 A | 5/2000 | Penfield et al. |
| 6,058,375 A | 5/2000 | Park |
| 6,061,679 A | 5/2000 | Bournas et al. |
| 6,067,574 A | 5/2000 | Tzeng |
| 6,070,051 A | 5/2000 | Astrom et al. |
| 6,075,796 A | 6/2000 | Katseff et al. |
| 6,078,897 A | 6/2000 | Rubin et al. |
| 6,092,055 A | 7/2000 | Owens et al. |
| 6,112,190 A | 8/2000 | Fletcher et al. |
| 6,112,304 A | 8/2000 | Clawson |
| 6,141,759 A | 10/2000 | Braddy |
| 6,154,765 A | 11/2000 | Hart |
| 6,170,014 B1 | 1/2001 | Darago et al. |
| 6,185,225 B1 | 2/2001 | Proctor |
| 6,185,557 B1 | 2/2001 | Liu |
| 6,223,172 B1 | 4/2001 | Hunter et al. |
| 6,236,972 B1 | 5/2001 | Shkedy |
| 6,236,988 B1 | 5/2001 | Aldred |
| 6,243,760 B1 | 6/2001 | Armbuster et al. |
| 6,266,660 B1 | 7/2001 | Liu et al. |
| 6,311,185 B1 | 10/2001 | Markowitz et al. |
| 6,311,186 B1 | 10/2001 | MeLampy et al. |
| 6,314,365 B1 | 11/2001 | Smith |
| 6,341,272 B1 | 1/2002 | Randle |
| 6,347,340 B1 | 2/2002 | Coelho et al. |
| 6,351,778 B1 | 2/2002 | Orton et al. |
| 6,356,897 B1 | 3/2002 | Gusack |
| 6,377,938 B1 | 4/2002 | Block et al. |
| 6,377,957 B1 | 4/2002 | Jeyaraman |
| 6,381,228 B1 | 4/2002 | Prieto et al. |
| 6,381,605 B1 | 4/2002 | Kothuri et al. |
| 6,381,607 B1 | 4/2002 | Wu et al. |
| 6,400,729 B1 | 6/2002 | Shimadoi et al. |
| 6,400,925 B1 | 6/2002 | Tirabassi et al. |
| 6,401,098 B1 | 6/2002 | Moulin |
| 6,415,323 B1 | 7/2002 | McCanne et al. |
| 6,427,172 B1 | 7/2002 | Thacker et al. |
| 6,429,812 B1 | 8/2002 | Hoffberg |
| 6,442,652 B1 | 8/2002 | Laboy et al. |
| 6,446,068 B1 | 9/2002 | Kortge |
| 6,457,021 B1 * | 9/2002 | Berkowitz et al. ...... 707/999.201 |
| 6,463,439 B1 * | 10/2002 | Dahlberg ...................... 707/624 |
| 6,477,651 B1 | 11/2002 | Teal |
| 6,481,752 B1 | 11/2002 | DeJoseph |
| 6,490,592 B1 | 12/2002 | St. Denis et al. |
| 6,494,367 B1 | 12/2002 | Zacharias |
| 6,515,968 B1 | 2/2003 | Combar et al. |
| 6,529,915 B1 | 3/2003 | Owens et al. |

(56) References Cited

U.S. PATENT DOCUMENTS

| | | |
|---|---|---|
| 6,532,283 B1 | 3/2003 | Ingram |
| 6,553,336 B1 | 4/2003 | Johnson et al. |
| 6,563,800 B1 | 5/2003 | Salo et al. |
| 6,564,047 B1 | 5/2003 | Steele et al. |
| 6,564,247 B1 | 5/2003 | Todorov |
| 6,567,408 B1 | 5/2003 | Li et al. |
| 6,658,415 B1 | 12/2003 | Brown et al. |
| 6,658,463 B1 | 12/2003 | Dillon et al. |
| 6,662,180 B1 | 12/2003 | Aref et al. |
| 6,662,184 B1 | 12/2003 | Friedberg |
| 6,678,675 B1 | 1/2004 | Rothrock |
| 6,700,869 B1 | 3/2004 | Falco et al. |
| 6,725,052 B1 | 4/2004 | Raith |
| 6,735,631 B1 | 5/2004 | Oehrke et al. |
| 6,766,508 B1 | 7/2004 | Isham |
| 6,779,030 B1 | 8/2004 | Dugan et al. |
| 6,819,933 B1 | 11/2004 | Tirabassi et al. |
| 6,885,657 B1 | 4/2005 | Rabenko et al. |
| 6,885,734 B1 | 4/2005 | Eberle et al. |
| 6,901,507 B2 | 5/2005 | Wishneusky |
| 6,907,429 B2 | 6/2005 | Carneal et al. |
| 6,931,253 B1 | 8/2005 | Hartikainen et al. |
| 6,947,440 B2 | 9/2005 | Chatterjee et al. |
| 6,963,636 B1 | 11/2005 | Kunugi et al. |
| 6,973,057 B1 | 12/2005 | Forslow |
| 7,003,280 B2 | 2/2006 | Pelaez et al. |
| 7,089,262 B2 | 8/2006 | Owens et al. |
| 7,099,898 B1 * | 8/2006 | Nakamura et al. ...... 707/999.203 |
| 7,181,537 B2 | 2/2007 | Costa-Requena et al. |
| 7,233,918 B1 | 6/2007 | Ye et al. |
| 7,239,689 B2 | 7/2007 | Diomelli |
| 7,246,102 B2 | 7/2007 | McDaniel et al. |
| 7,257,611 B1 | 8/2007 | Shankar et al. |
| 7,391,784 B1 | 6/2008 | Renkel |
| 7,395,262 B1 | 7/2008 | Rothrock |
| 7,406,471 B1 | 7/2008 | Shankar et al. |
| 7,756,763 B1 | 7/2010 | Owens et al. |
| 7,809,768 B2 | 10/2010 | Owens et al. |
| 8,099,393 B2 | 1/2012 | Labuda et al. |
| 2001/0005372 A1 | 6/2001 | Cave et al. |
| 2001/0025273 A1 | 9/2001 | Walker et al. |
| 2001/0034704 A1 | 10/2001 | Farhat et al. |
| 2001/0040887 A1 | 11/2001 | Shtivelman et al. |
| 2001/0056362 A1 | 12/2001 | Hanagan et al. |
| 2002/0059163 A1 | 5/2002 | Smith |
| 2002/0073082 A1 | 6/2002 | Duvillier et al. |
| 2002/0078063 A1 | 6/2002 | Minder |
| 2002/0082881 A1 | 6/2002 | Price et al. |
| 2002/0087469 A1 | 7/2002 | Ganesan et al. |
| 2002/0106064 A1 | 8/2002 | Bekkevold et al. |
| 2002/0107754 A1 * | 8/2002 | Stone .............................. 705/26 |
| 2003/0014361 A1 | 1/2003 | Klatt et al. |
| 2003/0014656 A1 | 1/2003 | Ault et al. |
| 2003/0016795 A1 | 1/2003 | Brandenberger |
| 2003/0097547 A1 | 5/2003 | Wishneusky |
| 2003/0118039 A1 | 6/2003 | Nishi et al. |
| 2003/0133552 A1 | 7/2003 | Pillai et al. |
| 2003/0202521 A1 | 10/2003 | Havinis et al. |
| 2003/0204514 A1 | 10/2003 | Owens et al. |
| 2004/0002918 A1 | 1/2004 | McCarthy et al. |
| 2004/0018829 A1 | 1/2004 | Raman et al. |
| 2005/0018689 A1 | 1/2005 | Chudoba |
| 2005/0033847 A1 | 2/2005 | Roy |
| 2005/0036487 A1 | 2/2005 | Srikrishna |
| 2005/0065880 A1 | 3/2005 | Amato et al. |
| 2005/0091156 A1 | 4/2005 | Hailwood et al. |
| 2005/0107066 A1 | 5/2005 | Erskine et al. |
| 2005/0113062 A1 | 5/2005 | Pelaez et al. |
| 2005/0125305 A1 | 6/2005 | Benco et al. |
| 2005/0187841 A1 | 8/2005 | Grear et al. |
| 2005/0238154 A1 | 10/2005 | Heaton et al. |
| 2006/0010057 A1 | 1/2006 | Bradway et al. |
| 2006/0148446 A1 | 7/2006 | Karlsson |
| 2006/0190478 A1 | 8/2006 | Owens et al. |
| 2006/0248010 A1 | 11/2006 | Krishnamoorthy et al. |
| 2007/0091874 A1 | 4/2007 | Rockel et al. |
| 2007/0110083 A1 | 5/2007 | Krishnamoorthy et al. |
| 2007/0133575 A1 | 6/2007 | Cai et al. |
| 2007/0198283 A1 | 8/2007 | Labuda et al. |
| 2007/0288367 A1 | 12/2007 | Krishnamoorthy et al. |
| 2007/0288368 A1 | 12/2007 | Krishnamoorthy et al. |
| 2008/0033873 A1 | 2/2008 | Krishnamoorthy et al. |
| 2008/0033874 A1 | 2/2008 | Krishnamoorthy et al. |
| 2008/0040267 A1 | 2/2008 | Krishnamoorthy et al. |
| 2011/0171948 A1 | 7/2011 | Labuda et al. |
| 2012/0084797 A1 | 4/2012 | Labuda et al. |

FOREIGN PATENT DOCUMENTS

| | | |
|---|---|---|
| WO | WO 95/27255 A1 | 10/1995 |
| WO | WO 96/34350 A1 | 10/1996 |
| WO | WO 97/03406 A1 | 1/1997 |
| WO | WO 98/52131 A1 | 11/1998 |
| WO | WO 2007/002841 A2 | 1/2007 |
| WO | WO 2007/016412 A2 | 2/2007 |

OTHER PUBLICATIONS

"ISP Billing Systems", Compaq ActiveAnswers White Paper, Jan. 2001, 16 pages.*

Peter Dibble, "Deadline Scheduling", published Mar. 4, 2001.*

U.S. Appl. No. 10/394,409, filed Mar. 21, 2003, Advisory Action mailed Jul. 19, 2011, 2 pages.

U.S. Appl. No. 10/394,409, filed Mar. 21, 2003, Office Action mailed Nov. 3, 2010, 14 pages.

U.S. Appl. No. 13/303,547, filed Nov. 23, 2011, Office Action mailed Jul. 25, 2012, 7 pages.

Agarwal et al., "Architecting Object Applications for High Performance With Relational Databases", High Performance Object/Relational Applications, Aug. 10, 1995, 8 pages.

Black, "Real-Time Fraud Management", Billing World, Jul./Aug. 1999; 3 pages.

Blaha, Michael R. et al., "Relational Database Design Using an Object Oriented Methodology", Communication of the ACM, Apr. 1988, vol. 31, No. 4, pp. 414-427, 14 pages.

Borland's Paradox for Windows User Guide, Version 5.0, Borland International, Inc., 1994, 185 pages.

Chenho, Kung, "Object Subclass Hierarchy in SQL: A Simple Approach", Jul. 1990, Communications of the ACM, vol. 33, No. 7, pp. 117-125, 9 pages.

Chester, Thomas et al., Mastering Excel 97, 4th Ed., Sybex Inc., Alameda, CA, 1997, 200 pages.

Davis, Charles, "Online Financing to Boost Procurement", Electronic Payments International, p. 14, Feb. 2000, 3 pages.

Derfler, Frank J. et al., "How Networks Work", Millenium Ed., Que Corporation, Jan. 2000, 249 pages (2 pdf attachments).

Gavron, Jacquelyn et al., "How To Use Microsoft Windows NT 4 Workstation", MacMillan Computer Publishing, USA, 1996, 25 pages.

Gomez-Perez et al., "Towards A Method to Conceptualize Domain Ontologies", Workshop on Ontological Engineering, ECAI' 96, Budapest, Aug. 12, 1996, pp. 41-51, 11 pages.

Gralla, Preston, "How the Internet Works", Millenium Ed., Que Corporation, Aug. 1999, 357 pages (3 pdf attachments).

Horngren, Charles T. et al., "Introduction to Financial Accounting", Revised 3rd Ed., Prentice-Hall, Inc., 1988, 561 pages (3 pdf attachments).

Iannella et al., "Metadata: Enabling the Internet", Jan. 1997, Research Data Network CRC, 7 pages.

Muller, Nathan J., "Desktop Encyclopedia of the Internet", Artech House, Inc., 1998, 604 pages (3 pdf attachments).

Oracle Applications, Concepts, Release 11 for UNX, Apr. 1998, 90 pages.

Oracle Server Distribution Systems, vol. II: Replicated Data, Release 7.3, Feb. 1996, 469 pages.

Peachtree, "Using General Ledger User Guide", Peachtree Software, Inc., 1989, 319 pages.

PR Newswire, "Regions to Offer Secure Internet Banking from Security First Technologies", Apr. 3, 1997, p. 0403ATTH003, 3 pages.

(56) References Cited

OTHER PUBLICATIONS

Reinwald et al., "Storing and Using Objects in a Relational Database", IBM Systems Journal, vol. 35, No. 2, May 1996, pp. 172-191, 20 pages.

Riley, David D., "Data Abstraction and Structures: An Introduction to Computer Science II", Boyd and Fraser Publishing Company, 1987, 30 pages.

Search Report and Written Opinion for Application PCT/US06/29571, mailed on Apr. 16, 2007; 10 pages.

Search Report for Application PCT/US06/25405, mailed on Apr. 3, 2008, 2 pages.

Shah, Ashwin V. et al., "DSM: An Object-Relationship Modeling Language", OOPSLA '89, Oct. 1-6, 1989, pp. 191-202, 12 pages.

Skold, Martin, "QDB—A Query Processor for the High Performance, Parallel Data Server NDB Cluster", Linkopings University, Sweden, Apr. 1999, 28 pages.

St. Pierre et al., "Issues in Crosswalking Content Metadata Standards", Oct. 15, 1998, National Information Standards Organization, 8 pages.

Syverson, Nancy, "Inside Graybar: A Profile of the Nation's Top Electrical Distributor", Industrial Maintenance and Plant Operation, vol. 61, No. 11, p. 14, Nov. 2000, 4 pages.

White, Ron, "How Computers Work", Millenium Ed., Que Corporation, Sep. 1999, 322 pages (2 pdf attachments).

U.S. Appl. No. 09/562,785, filed May 2, 2000, Advisory Action mailed Mar. 26, 2007, 3 pages.

U.S. Appl. No. 09/562,785, filed May 2, 2000, Final Office Action mailed Jan. 11, 2007, 16 pages.

U.S. Appl. No. 09/562,785, filed May 2, 2000, Final Office Action mailed Sep. 27, 2004, 17 pages.

U.S. Appl. No. 09/562,785, filed May 2, 2000, Notice of Allowance mailed May 21, 2007, 7 pages.

U.S. Appl. No. 09/562,785, filed May 2, 2000, Office Action mailed Feb. 17, 2004, 9 pages.

U.S. Appl. No. 09/562,785, filed May 2, 2000, Office Action mailed Jul. 25, 2006, 17 pages.

U.S. Appl. No. 09/569,097, filed May 10, 2000, Advisory Action mailed May 11, 2009, 3 pages.

U.S. Appl. No. 09/569,097, filed May 10, 2000, Advisory Action mailed May 6, 2008, 3 pages.

U.S. Appl. No. 09/569,097, filed May 10, 2000, Advisory Action mailed Jun. 24, 2004, 2 pages.

U.S. Appl. No. 09/569,097, filed May 10, 2000, Final Office Action mailed Jan. 28, 2004, 8 pages.

U.S. Appl. No. 09/569,097, filed May 10, 2000, Final Office Action mailed Feb. 11, 2008, 6 pages.

U.S. Appl. No. 09/569,097, filed May 10, 2000, Final Office Action mailed Mar. 4, 2009, 8 pages.

U.S. Appl. No. 09/569,097, filed May 10, 2000, Final Office Action mailed Jun. 16, 2005, 14 pages.

U.S. Appl. No. 09/569,097, filed May 10, 2000, Notice of Allowance mailed Mar. 5, 2010, 8 pages.

U.S. Appl. No. 09/569,097, filed May 10, 2000, Office Action mailed Oct. 7, 2002, 5 pages.

U.S. Appl. No. 09/569,097, filed May 10, 2000, Office Action mailed Oct. 7, 2004, 11 pages.

U.S. Appl. No. 09/569,097, filed May 10, 2000, Office Action mailed Jul. 3, 2003, 7 pages.

U.S. Appl. No. 09/569,097, filed May 10, 2000, Office Action mailed Aug. 9, 2007, 7 pages.

U.S. Appl. No. 09/569,097, filed May 10, 2000, Office Action mailed Sep. 1, 2009, 6 pages.

U.S. Appl. No. 09/569,097, filed May 10, 2000, Office Action mailed Sep. 3, 2008, 5 pages.

U.S. Appl. No. 09/617,590, filed Jul. 18, 2000, Final Office Action mailed Jun. 14, 2005, 9 pages.

U.S. Appl. No. 09/617,590, filed Jul. 18, 2000, Notice of Allowance mailed Mar. 27, 2006, 9 pages.

U.S. Appl. No. 09/617,590, filed Jul. 18, 2000, Office Action mailed Nov. 16, 2004, 11 pages.

U.S. Appl. No. 09/617,590, filed Jul. 18, 2000, Office Action mailed Feb. 17, 2004, 9 pages.

U.S. Appl. No. 09/617,590, filed Jul. 18, 2000, Office Action mailed Jul. 25, 2006, 8 pages.

U.S. Appl. No. 09/617,590, filed Jul. 18, 2000, Office Action mailed Sep. 27, 2006, 8 pages.

U.S. Appl. No. 09/967,493, filed Sep. 27, 2001, Final Office Action mailed Dec. 19, 2006, 31 pages.

U.S. Appl. No. 09/967,493, filed Sep. 27, 2001, Final Office Action mailed Aug. 19, 2005, 23 pages.

U.S. Appl. No. 09/967,493, filed Sep. 27, 2001, Notice of Allowance mailed Apr. 11, 2008, 11 pages.

U.S. Appl. No. 09/967,493, filed Sep. 27, 2001, Office Action mailed Jan. 14, 2004, 14 pages.

U.S. Appl. No. 09/967,493, filed Sep. 27, 2001, Office Action mailed Dec. 2, 2004, 21 pages.

U.S. Appl. No. 09/967,493, filed Sep. 27, 2001, Office Action mailed May 16, 2006, 25 pages.

U.S. Appl. No. 09/967,493, filed Sep. 27, 2001, Office Action mailed Sep. 11, 2007, 14 pages.

U.S. Appl. No. 09/967,493, filed Sep. 27, 2001, Petition Decision mailed Dec. 18, 2006, 1 page.

U.S. Appl. No. 10/375,694, filed Feb. 26, 2003, Final Office Action mailed May 13, 2005, 13 pages.

U.S. Appl. No. 10/375,694, filed Feb. 26, 2003, Notice of Allowance mailed Apr. 3, 2006, 4 pages.

U.S. Appl. No. 10/375,694, filed Feb. 26, 2003, Office Action mailed Oct. 13, 2005, 8 pages.

U.S. Appl. No. 10/375,694, filed Feb. 26, 2003, Office Action mailed Sep. 7, 2004, 11 pages.

U.S. Appl. No. 10/394,409, filed Mar. 21, 2003, Advisory Action mailed Jan. 23, 2009, 3 pages.

U.S. Appl. No. 10/394,409, filed Mar. 21, 2003, Advisory Action mailed Oct. 23, 2009, 3 pages.

U.S. Appl. No. 10/394,409, filed Mar. 21, 2003, Advisory Action mailed May 2, 2007, 3 pages.

U.S. Appl. No. 10/394,409, filed Mar. 21, 2003, Final Office Action mailed Feb. 22, 2007, 12 pages.

U.S. Appl. No. 10/394,409, filed Mar. 21, 2003, Final Office Action mailed Aug. 19, 2009, 10 pages.

U.S. Appl. No. 10/394,409, filed Mar. 21, 2003, Final Office Action mailed Sep. 29, 2008, 19 pages.

U.S. Appl. No. 10/394,409, filed Mar. 21, 2003, Office Action mailed Feb. 21, 2008, 20 pages.

U.S. Appl. No. 10/394,409, filed Mar. 21, 2003, Office Action mailed Mar. 4, 2009, 12 pages.

U.S. Appl. No. 10/394,409, filed Mar. 21, 2003, Final Office Action mailed May 9, 2011, 14 pages.

U.S. Appl. No. 10/394,409, filed Mar. 21, 2003, Office Action mailed May 25, 2010, 10 pages.

U.S. Appl. No. 10/394,409, filed Mar. 21, 2003, Office Action mailed Aug. 3, 2007, 11 pages.

U.S. Appl. No. 10/394,409, filed Mar. 21, 2003, Office Action mailed Sep. 1, 2006, 8 pages.

U.S. Appl. No. 10/394,409, filed Mar. 21, 2003, Notice of Allowance mailed on Sep. 27, 2011, 11 pages.

U.S. Appl. No. 10/706,151, filed Feb. 26, 2003, Final Office Action mailed Mar. 23, 2006, 8 pages.

U.S. Appl. No. 10/706,151, filed Feb. 26, 2003, Final Office Action mailed May 13, 2005, 5 pages.

U.S. Appl. No. 10/706,151, filed Feb. 26, 2003, Notice of Allowance mailed Apr. 18, 2008, 7 pages.

U.S. Appl. No. 10/706,151, filed Feb. 26, 2003, Office Action mailed Oct. 10, 2007, 5 pages.

U.S. Appl. No. 10/706,151, filed Feb. 26, 2003, Office Action mailed Oct. 20, 2004, 4 pages.

U.S. Appl. No. 10/706,151, filed Feb. 26, 2003, Office Action mailed Sep. 16, 2005, 6 pages.

U.S. Appl. No. 11/414,072, filed Apr. 27, 2006, Advisory Action mailed Jan. 9, 2009, 3 pages.

U.S. Appl. No. 11/414,072, filed Apr. 27, 2006, Advisory Action mailed Dec. 28, 2009, 3 pages.

(56) References Cited

OTHER PUBLICATIONS

U.S. Appl. No. 11/414,072, filed Apr. 27, 2006, Final Office Action mailed Oct. 16, 2009, 19 pages.
U.S. Appl. No. 11/414,072, filed Apr. 27, 2006, Final Office Action mailed Oct. 23, 2008, 20 pages.
U.S. Appl. No. 11/414,072, filed Apr. 27, 2006, Notice of Allowance mailed Jun. 1, 2010, 15 pages.
U.S. Appl. No. 11/414,072, filed Apr. 27, 2006, Office Action mailed Mar. 24, 2009, 15 pages.
U.S. Appl. No. 11/414,072, filed Apr. 27, 2006, Office Action mailed Apr. 24, 2008, 32 pages.
U.S. Appl. No. 11/415,759, filed May 1, 2006, Office Action mailed Mar. 30, 2010, 8 pages.
U.S. Appl. No. 11/415,759, filed May 1, 2006, Final Office Action mailed Nov. 17, 2010, 8 pages.
U.S. Appl. No. 11/559,969, filed Nov. 15, 2006, Office Action mailed Oct. 2, 2009, 10 pages.
U.S. Appl. No. 11/559,969, filed Nov. 15, 2006, Office Action mailed Mar. 31, 2010, 12 pages.
U.S. Appl. No. 11/559,969, filed Nov. 15, 2006, Office Action mailed Mar. 5, 2009, 10 pages.
U.S. Appl. No. 11/559,969, filed Nov. 15, 2006, Final Office Action mailed Oct. 4, 2010, 13 pages.
U.S. Appl. No. 11/760,427, filed Jun. 8, 2007, Office Action mailed Dec. 11, 2009, 12 pages.
U.S. Appl. No. 11/760,519, filed Jun. 8, 2007, Office Action mailed Jan. 21, 2010, 8 pages.
U.S. Appl. No. 11/760,519, filed Jun. 8, 2007, Final Office Action mailed Jul. 26, 2010, 14 pages.
Abbot et al., "Scheduling Real-Time Transactions: A Performance Evaluation", ACM Transactions on Database Systems, Sep. 1992, vol. 17, No. 3, pp. 513-560.
Ming Xiong et al., "Maintaining Temporal Consistency: Issues and Algorithms", First International Workshop on Real-Time Databases, Mar. 1996, Newport Beach, California.
U.S. Appl. No. 09/562,785, filed May 2, 2000, Petition Decision—Approved mailed Dec. 7, 2006.
U.S. Appl. No. 09/617,590, filed Jul. 18, 2000, Petition Decision—Approved mailed Jan. 4, 2007, 3 pages.
U.S. Appl. No. 10/706,151, filed Feb. 26, 2003, Terminal Disclaimer—Approved mailed Apr. 25, 2008.
U.S. Appl. No. 10/706,151, filed Feb. 26, 2003, Terminal Disclaimer—Approved mailed Apr. 9, 2008.
U.S. Appl. No. 10/706,151, filed Feb. 26, 2003, Petition Decision—Approved mailed Jan. 8, 2007.
U.S. Appl. No. 11/414,072, filed Apr. 27, 2006, Terminal Disclaimer—Approved mailed Aug. 18, 2008.
U.S. Appl. No. 11/414,072, filed Apr. 27, 2006, Petition Decision—Not Approved mailed Aug. 18, 2008.
U.S. Appl. No. 13/303,547, filed Nov. 23, 2011, Final Office Action mailed Dec. 20, 2012, 22 pages.
U.S. Appl. No. 08/856,375, filed May 14, 1997, Notice of Allowance mailed Sep. 16, 1999.
U.S. Appl. No. 08/856,375, filed May 14, 1997, Notice of Allowance mailed Apr. 15, 1999.
U.S. Appl. No. 08/856,375, filed May 14, 1997, Non-Final Office Action mailed Sep. 22, 1998.
U.S. Appl. No. 09/454,519, filed Dec. 6, 1999, Notice of Allowance mailed Sep. 30, 2002.
U.S. Appl. No. 09/454,519, filed Dec. 6, 1999, Terminal Disclaimer—Accepted mailed Sep. 30, 2002.
U.S. Appl. No. 09/454,519, filed Dec. 6, 1999, Non-Final Office Action mailed Feb. 5, 2002.
U.S. Appl. No. 08/856,313, filed May 14, 1997, Notice of Allowance mailed Nov. 22, 1999.
U.S. Appl. No. 08/856,313, filed May 14, 1997, Non-Final Office Action mailed Apr. 12, 1999.
U.S. Appl. No. 08/856,313, filed May 14, 1997, Non-Final Office Action mailed Oct. 26, 1998.
U.S. Appl. No. 08/856,372, filed May 14, 1997, Notice of Allowance mailed Feb. 15, 2000.
U.S. Appl. No. 08/856,372, filed May 14, 1997, Non-Final Office Action mailed Aug. 16, 1999.
U.S. Appl. No. 09/539,669, filed Mar. 30, 2000, Notice of Allowance mailed Jun. 13, 2003.
U.S. Appl. No. 09/539,669, filed Mar. 30, 2000, Non-Final Office Action mailed Dec. 27, 2002.
U.S. Appl. No. 09/539,669, filed Mar. 30, 2000, Non-Final Office Action mailed May 8, 2002.
Tomoyoshi, S., et al., "Table-Based QoS Control for Embedded Real-Time Systems", ACM LCTES '99, May 1999, pp. 65-72.
U.S. Appl. No. 13/303,547, filed Nov. 23, 2011, Non-Final Office Action mailed May 24, 2013, 22 pages.
von Bachmann, G., et al., "Introducing QoS to Electronic Commerce Applications," Springer (2001), ISEC 2001, LNCS 2040, pp. 138-147.
U.S. Appl. No. 13/303,547, Final Office Action mailed on Oct. 23, 2013, 15 pages.
U.S. Appl. No. 13/303,547, Final Office Action mailed on Sep. 23, 2013, 22 pages.
Buchmann et al., Time-Critical Database Scheduling: A Framework for Integrating Real-Time Scheduling and Concurrency Control, IEEE, 1989, pp. 470-480.
U.S. Appl. No. 13/303,547, Notice of Allowance mailed on Jan. 17, 2014, 12 pages.

* cited by examiner

COMMITTING EVENTS WHERE TRANSACTION THREADS HAVE READ-ONLY ACCESS TO SHARED MEMORY

This application is a Divisional of U.S. application Ser. No. 10/394,409, filed Mar. 21, 2003 now U.S. Pat. No. 8,099,393, which claims priority to provisional application 60/366,827, filed Mar. 22, 2002, both of which are hereby incorporated by reference.

BACKGROUND OF THE INVENTION

The present invention relates to event processing systems. More specifically, the invention relates to event processing systems that process events, such as for billing, in real time.

With the dramatic increase in the number of on-line and wireless transactions (or events), accounting techniques have also had to evolve in order to keep pace with the consumer market place. In general, event processing systems receive events, rate the events according to a particular rating scheme and generate the appropriate billing information for the consumers. Although these steps are common to most all event processing systems, there are a variety of event processing systems currently in use.

An event processing system can operate as a batch system. FIG. 1 shows an event processing system that processes events 101 in batches. A rating engine 103 rates events 101 according to information received from a database 105. Database 105 can include, for example, customer information 107, accounts receivable (A/R) 109 and events 111.

Typically, batch systems rate events at non-peak hours of the day or week. As an example, a batch system could be configured to rate events at midnight each day. At midnight, all customer information 107 and A/R 109 may be sent to rating engine 103. Rating engine 103 then processes all the events and sends the appropriate changes to database 105 including events 111 that occurred.

Batch event processing systems are suitable in many applications. However, the systems include a number of disadvantages such as the data is inaccurate between and during batch processing. Although some current batch systems have increased the frequency that they perform event processing (e.g., every two hours; also called near real time systems), there is still time between when the event occurs and when the event is processed where data (e.g., account balances) may be in accurate. This can make these systems unsuitable for prepaid environments or any environment where the right to perform a transaction is based on an accurate analysis of the balance of an account.

Typically, batch event processing systems (or near real time systems) cannot process an event transactionally as a unit. Accordingly, these systems are not applicable where simultaneous events could occur that will compete to consume the same account resources (i.e., impact the same account balance).

Transactional real time event processing systems process events as they occur in real time. FIG. 2 shows a real time event processing system that processes events in real time. When an event 201 is received by a rating engine 203, information needed to rate event 201 is obtained from a database 205. The information in database 205 for rating an event can include customer information 207 and A/R 209 as shown.

Once rating engine 203 receives the information from database 205 for rating event 201, rating engine 203 rates event 201 and sends the appropriate changes to the information stored in the database 205 for updating. Database 205 can also store event 211. In this manner, events can be processed transactionally as units. If simultaneous events occur that are competing for the same resource, the events can be processed serially by locking access to the resource.

Although transactional real time event processing systems can provide significant advantages over batch processing systems, it would still be desirable to have improved systems that more efficiently process the events. Additionally, it will be beneficial if the improved techniques still maintained high availability and reliability for the information.

SUMMARY OF THE INVENTION

The invention provides systems and methods for more efficiently processing events, storing information and restoring information. In general, events can be processed in real time by storing information that is needed to rate the event locally, such as in the memory of the rating system. As the information for rating the event is available locally, it is not necessary to receive the information from a remote database. The rated event can be subsequently stored on a database, which can result in more efficient storing and restoring of the information. Several embodiments of the invention are described below.

In one embodiment, the invention provides a method of rating events in a real time transaction processing system. An event is received at a rating system and the event is rated at the rating system according to information stored locally on the rating system. The rated event can then be stored on a database system. In some embodiments, rated events are classified into multiple classes with different priorities for storage.

In another embodiment, the invention provides a method of storing events in a transaction processing system. Events are grouped for more efficient storage on a database system. Priorities of the events are analyzed and the events are stored in groups on the database system taking into account the priorities of the events. Typically, the priorities of the events include times by which events will be stored on the database system.

In another embodiment, the invention provides a method of restoring information in a transaction processing system. Information that was previously stored on a database system is retrieved. Additionally, rated events that were stored on the database system are retrieved. The rated events are applied to the previously stored information in order to restore information stored on the database system.

In another embodiment, the invention provides a method of committing events in a transaction processing system. One or more transaction threads process events utilizing read-only data from a shared memory of an in-memory database. The one or more transaction threads send information regarding a processed event to a commit engine. The commit engine updates the shared memory according to the processed event. Additionally, the commit engine can log the processed event to a storage device.

In another embodiment, the invention provides a method of committing events in a transaction processing system. Events to be committed are received where each event has a deadline specifying an amount of time that can elapse before the event should be committed. The event with the shortest deadline is selected and one or more events that can be committed with the selected event are identified. The selected event and the one or more events are committed to a storage device. In some embodiments, the events to be committed are sorted according to deadlines.

Other features and advantages of the invention will become readily apparent upon review of the following description in

DETAILED DESCRIPTION OF EMBODIMENTS

Embodiments of the invention are described below with reference to preferred embodiments that rate the events in real time. However, many aspects of the invention can be advantageously applied to other event processing systems and are therefore not limited to the system, or application that is described herein. Accordingly, the description of the embodiments is for purposed of illustration and not limitation.

Figure 1:
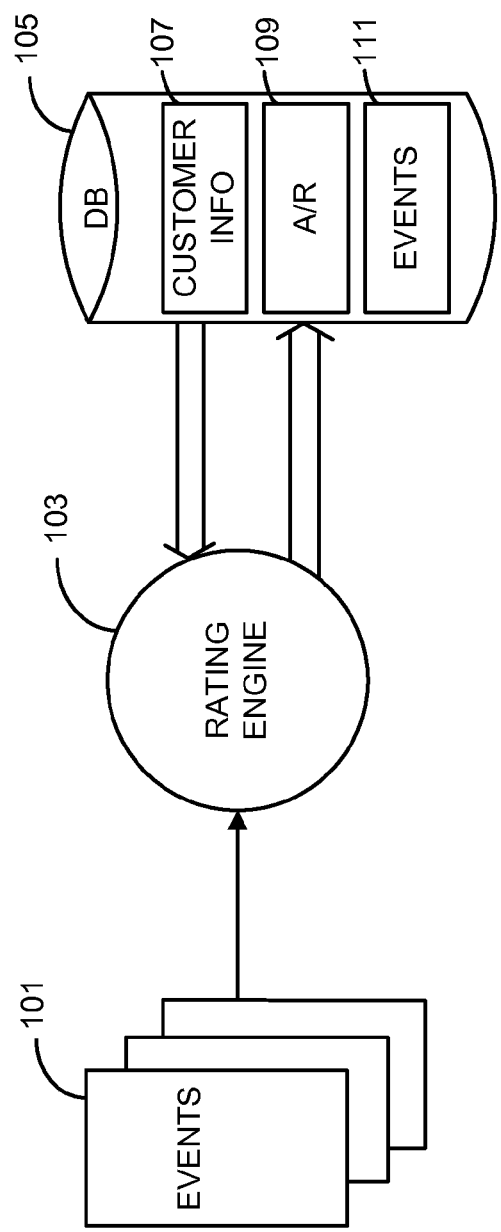
FIG. 1 shows an event processing system that processes events in batches (e.g., a batch processing system).
Figure 2:
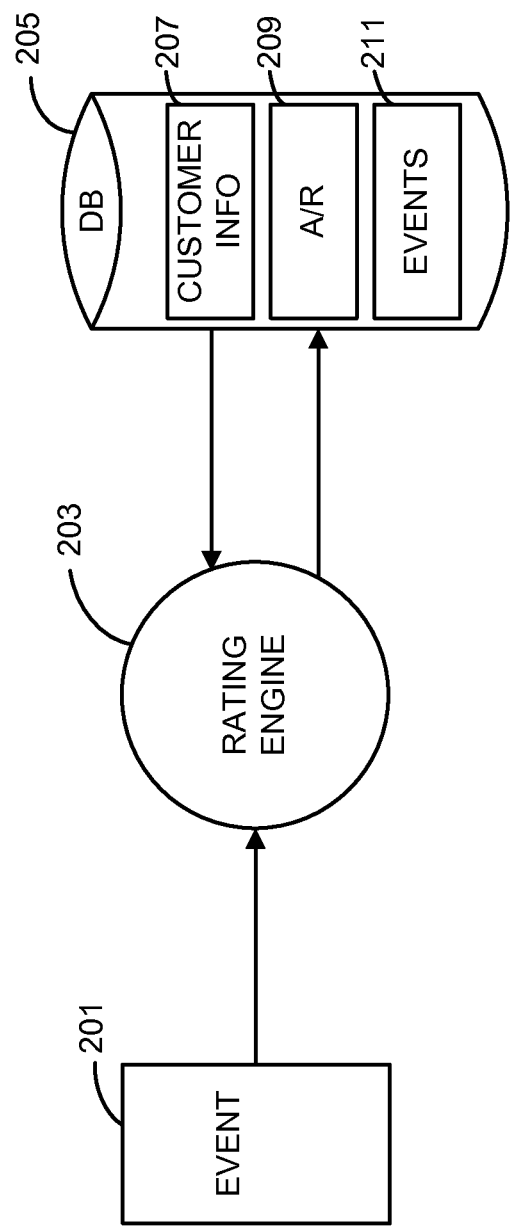
FIG. 2 shows an event processing system that processes events in real time.
Figure 3:
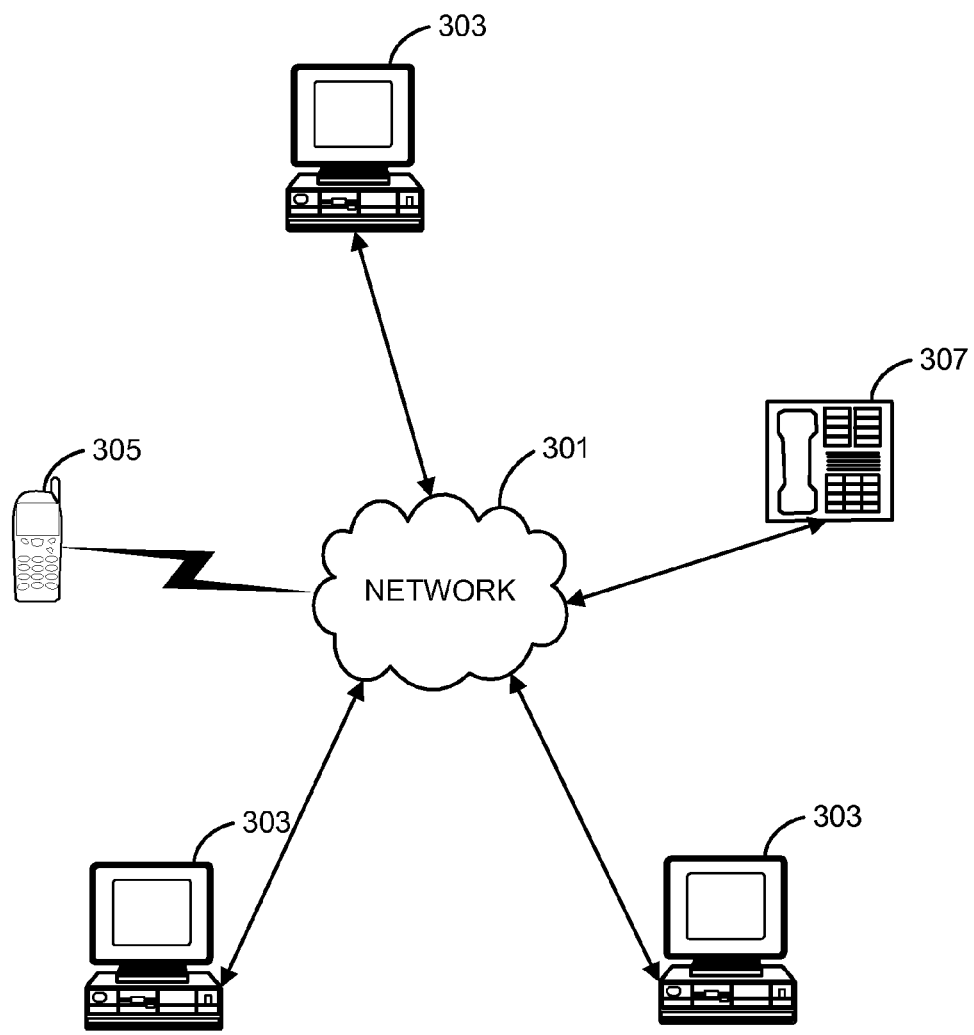
FIG. 3 shows a network of multiple computer systems and devices.

FIG. 3 shows an example of a network. A network 301 provides communication between and among multiple computer systems 303. Additionally, network 301 can receive information from devices such as a cellular (wireless) phone 305 and a conventional telephone 307.

In event processing systems, it should be understood that the rating and database systems are not necessarily on the same computer system 303. Furthermore, FIG. 3 illustrates that events can be received from numerous devices including a computer system 303 (such as for on-line Internet usage), cellular phone 305 (such as for wireless minutes) and telephone 307 (such as for telephones utilizing the Internet or voice over IP).

Figure 4:
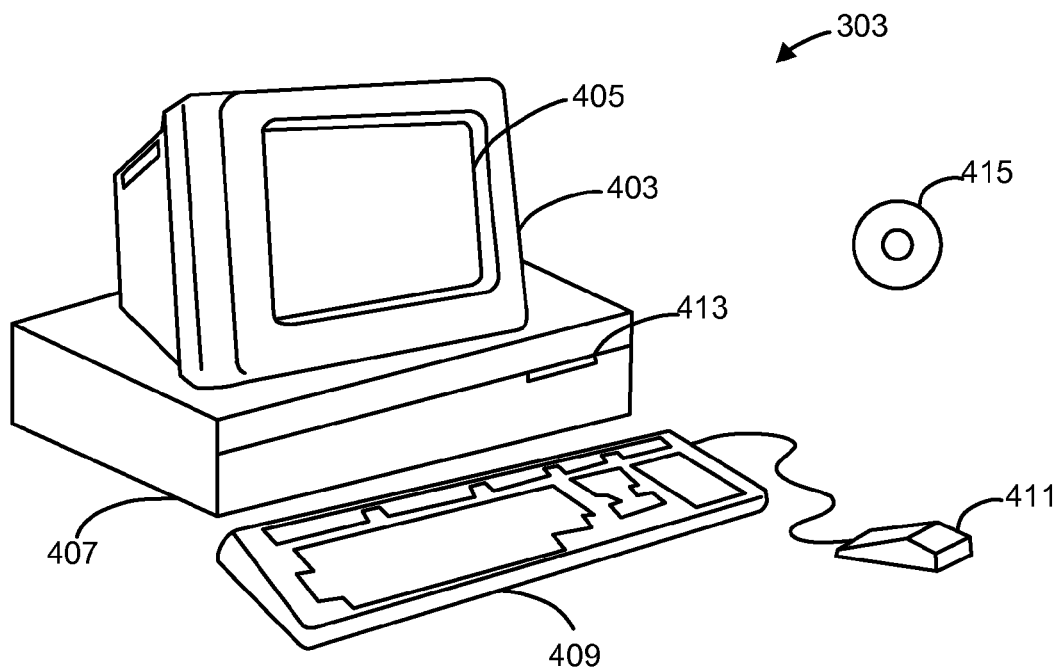
FIG. 4 illustrates and example of a computer system that can be utilized in association with embodiments of the invention.

FIG. 4 illustrates an example of a computer system that can be used in association with embodiments of the invention. FIG. 4 shows a computer system 303 that includes a display 403, screen 405, cabinet 407, keyboard 409, and mouse 411. Mouse 411 can have one or more buttons for interacting with a graphical user interface. Cabinet 407 houses CD-ROM DRIVE 413, system memory, and a hard drive (see FIG. 5), which can be utilized to store and retrieve software programs incorporating computer code that implement the invention, data for use with the invention, and the like. Although CD-ROM 415 is shown as an exemplary computer readable storage medium, other computer readable storage media including floppy disk, tape, flash memory, system, memory, and hard drives can be utilized.

Figure 5:
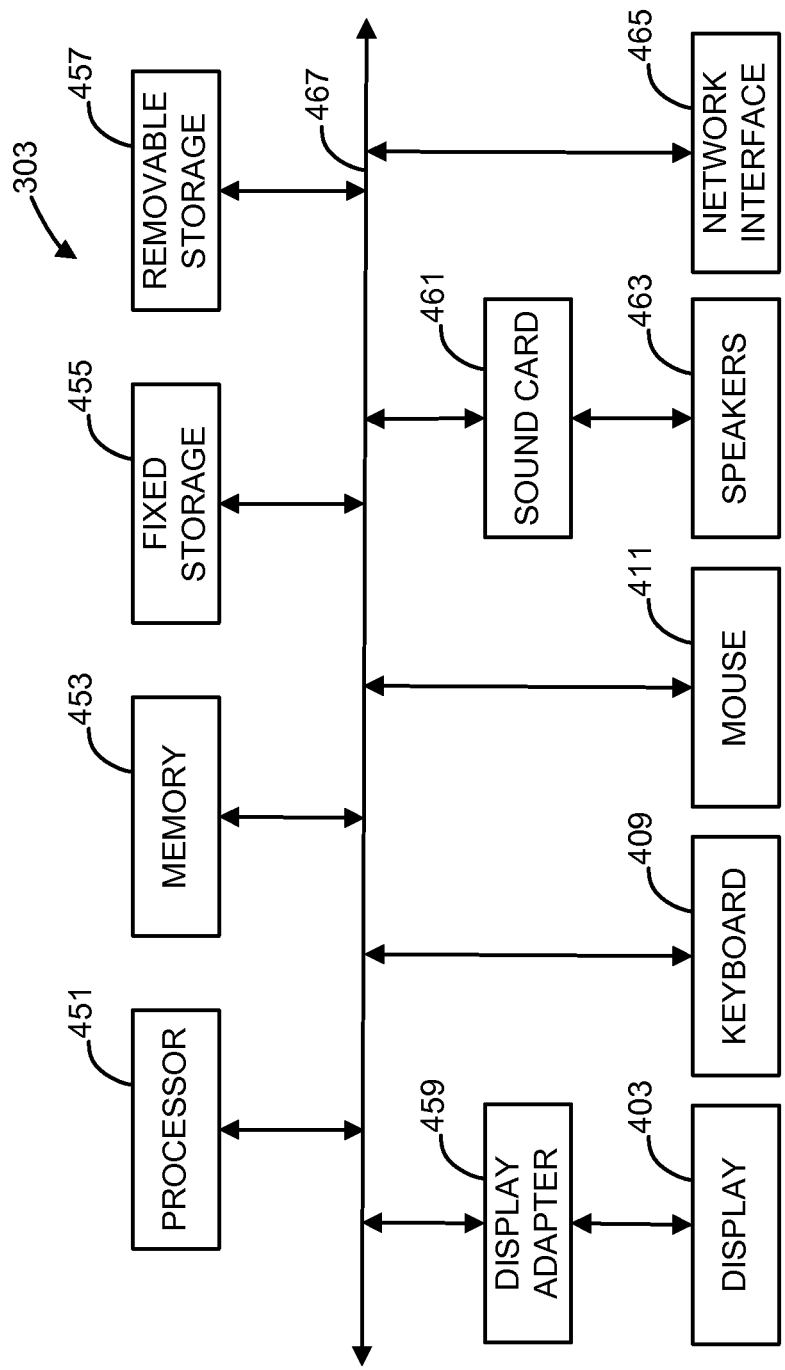
FIG. 5 illustrates a system block diagram of the computer system of FIG. 4.

FIG. 5 shows a system block diagram of computer system 303. As in FIG. 4, computer system 303 includes display 403, keyboard 409 and mouse 411. Computer system 303 further includes subsystems such as a central processor 451, system memory 453, fixed storage, 455 (e.g., hard drive) removable storage 457 (e.g., CD-ROM drive), display adapter 459, sound card 461, speakers 463, and network interface 465. Other computer systems suitable for use with the invention can include additional or fewer subsystems. For example, another computer system could include more than one processor 451 (i.e., a multi-processor system) or a cache memory.

The system bus architecture of computer system 303 is represented by arrows 467. However, these arrows are illustrative of any connection scheme serving to link the subsystems. For example, a local bus could be utilized to connect processor 451 to memory 453 and display adapter 459. Computer system 303 shown in FIG. 5 is but an example of a computer system suitable for use with the invention. Other computer architectures having different configurations of subsystems can also be utilized.

As the name implies, event processing systems process events. Events are typically generated when transactions are completed. For example, if a service provider is tracking the usage of a cellular telephone then an event can be generated when the call is complete. The event information can include data such as the duration of the call, the time of day, local/long distance, customer, and the like. Although events are typically generated when a transaction is complete, interim events can also be generated.

Figure 6:
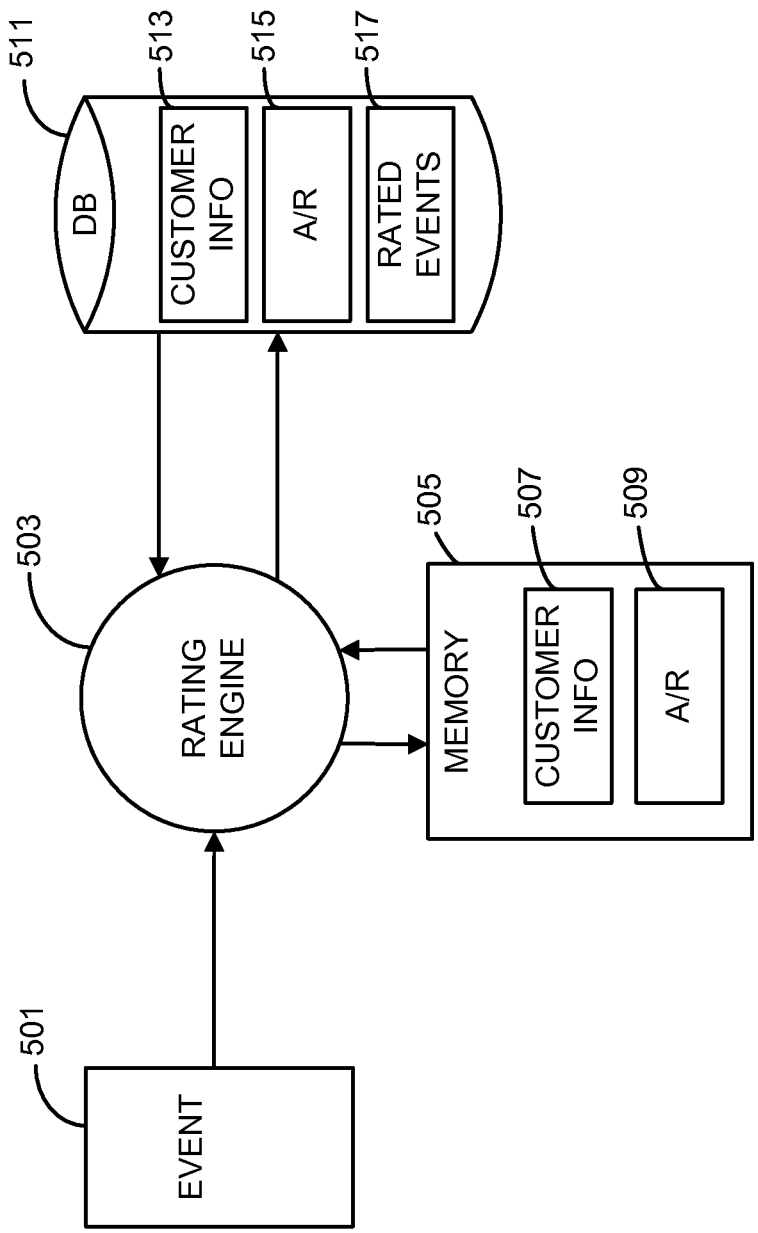
FIG. 6 shows an example of a real time event processing system according to one embodiment of the invention.

FIG. 6 shows a real time event processing system according to one embodiment of the invention. An event 501 is rated by a rating engine 503. Rating engine 503 receives information for rating event 501 from a memory 505. Memory 505 is local storage for rating engine 503 and can include any storage media including memory, hard disks and the like.

Memory 505 is shown to store customer information 507 and A/R 509. When rating engine 503 receives event 501, the rating engine retrieves the information that is necessary to rate event 501 from memory 505. Accordingly, rating engine 503 can rate event 501 without requiring retrieval of information from a remote database.

After rating event 501, information is sent to a database 511 that stores customer information 513, A/R 515 and rated events 517. Database 511 receives changes to the information stored on the database as a result of event 501. Additionally, database 511 acts as the permanent storage for the information and stores rated events 517, which can be utilized to restore information in memory 505 as will be discussed below. Typically, the information is stored in a relational database where related tables store the information.

With the embodiment shown in FIG. 6, rated events are stored on the database system. A rated event includes information that has been generated when the event was rated. In some embodiments, the rated events include information that has changed in the database as a result of the event. Thus, it is not necessary for database 511 to store all the specifics of the event, which can result in a significant savings in terms of the amount of information stored and the time it takes to store the information.

As an example, assume that the service provider described above that tracks cellular phone usage utilizing a complex formula for determining the cost of a call that includes the duration, time of day, local/long distance, location of the call, and the like. In some embodiments, this information need not be stored as the rated event can include the amount in which the customers balance has been increased by the event instead of all the information for rating the event. As will be described in more detail below, the rated events can also be utilized to restore information and it is not necessary to maintain a redo log.

Memory 505 can store the most up-to-date information so that this information is accurate at all times. Database 511 can be updated with changes to the information periodically with rated events 517 acting as a log for changes to the database.

Figure 7:
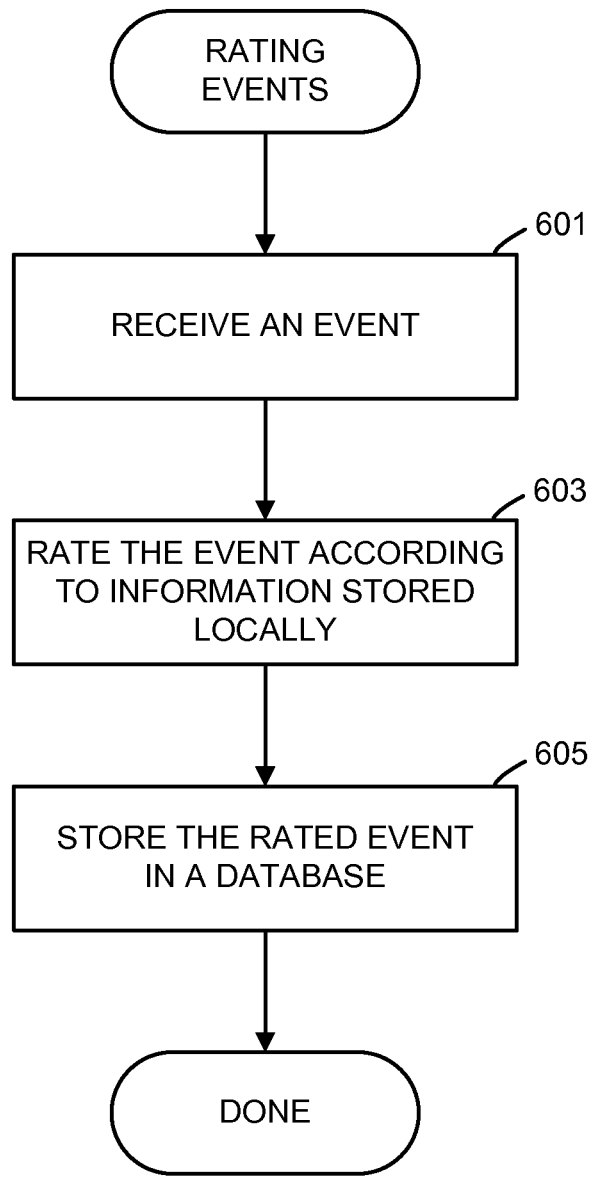
FIG. 7 shows a flow chart of a process of rating events that utilizes information stored locally on the rating system.

Now that an exemplary system has been described, it may be beneficial to describe a method of rating events according to one embodiment of the invention. As with all the flow charts shown herein, steps may be added, deleted, combined, and reordered without departing from the spirit and scope of the invention. FIG. 7 shows a flow chart of a process of rating events that utilizes information stored locally on the rating engine or system.

At a step 601, an event is received. As described above, the event can be the result of any number of different transactions that need to be rated. Additionally, some events are interim events that may be generated before a transaction is complete. The event is rated according to information stored locally at a step 603. Thus, the event is rated without necessitating retrieval of information from a remote database system.

At a step 605, the rated event is stored in a database. The rated event can include, among other things, changes to the information on the database that have occurred as a result of rating the event. Thus, the rated event includes information that was not included in the event.

With the embodiment shown in FIG. 7, events can be more efficiently rated and stored. For example, the information for rating the event does not need to be retrieved from a remote database and events can be more efficiently stored because information from the rating process can be utilized.

In some embodiments, events or rated events are classified into multiple classes with different priorities for storage. As an example, the different priorities can include times by which events will be stored on the database system. Thus, a service provider can provide different levels of service (quality of service or QoS) to different customers. One customer may require that the information be stored within a few milliseconds, whereas another customer may find it acceptable to have the information stored within hundreds of milliseconds.

Figure 8:
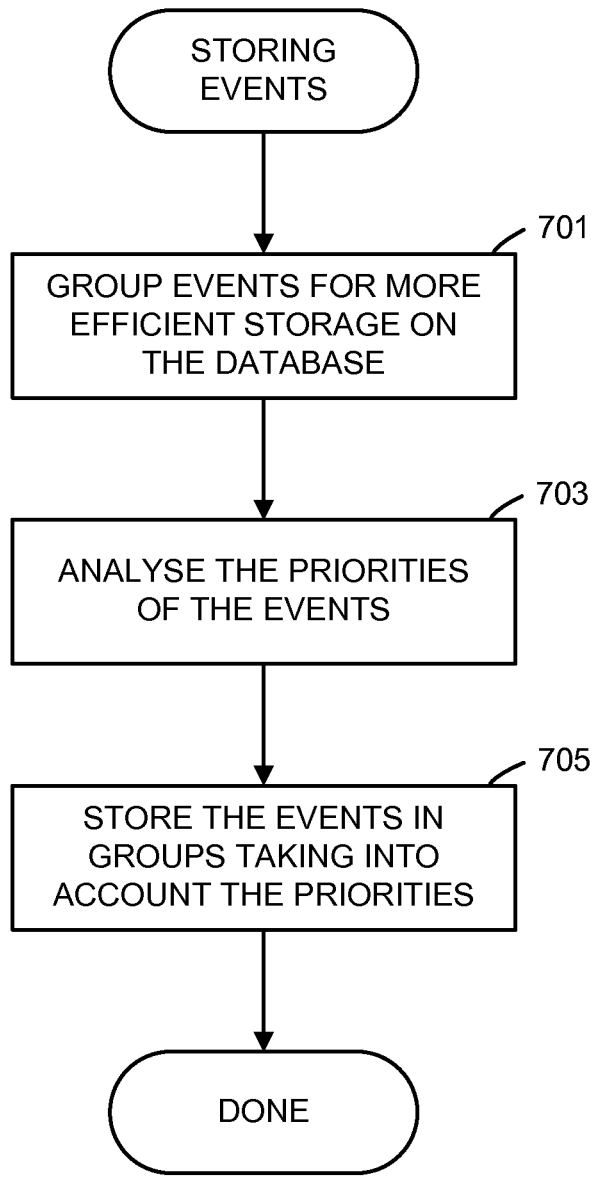
FIG. 8 shows a flow chart of a process of storing events on a database system that includes taking into account priorities of the events.

When the database system is storing events or rated events, the database system can take into account the priorities of the events when storing them on the database system. FIG. 8 shows a flow chart of a process of storing events that takes into account the priorities of the events.

At a step 701, events are grouped for more efficient storage on the database. Grouping events for more efficient storage on the database can include analyzing a curve of the hard drive storage efficiency, the hard drive latency, the size of the events, and/or any other information. As an example, it can be clearly seen that it may be more efficient to group two events if the events will be stored near the same physical location on the hard drive.

The priorities of the events are analyzed at a step 703. The priorities of the events can include times by which events will be stored on the database system. Therefore, although it may be efficient to group some events together, the grouping could result in a storage time that is outside the priority of one or more of the events. Additionally, the sequence of storing the events can be affected by their priorities such that events with a higher priority may be stored before earlier events with lower priorities.

At a step 705, the events are stored in groups on the database system taking into account the priorities of the events. By giving the events different priorities, the service provider is able to offer different levels of service to its customers while still maintaining the efficiency of the database system.

Figure 9:
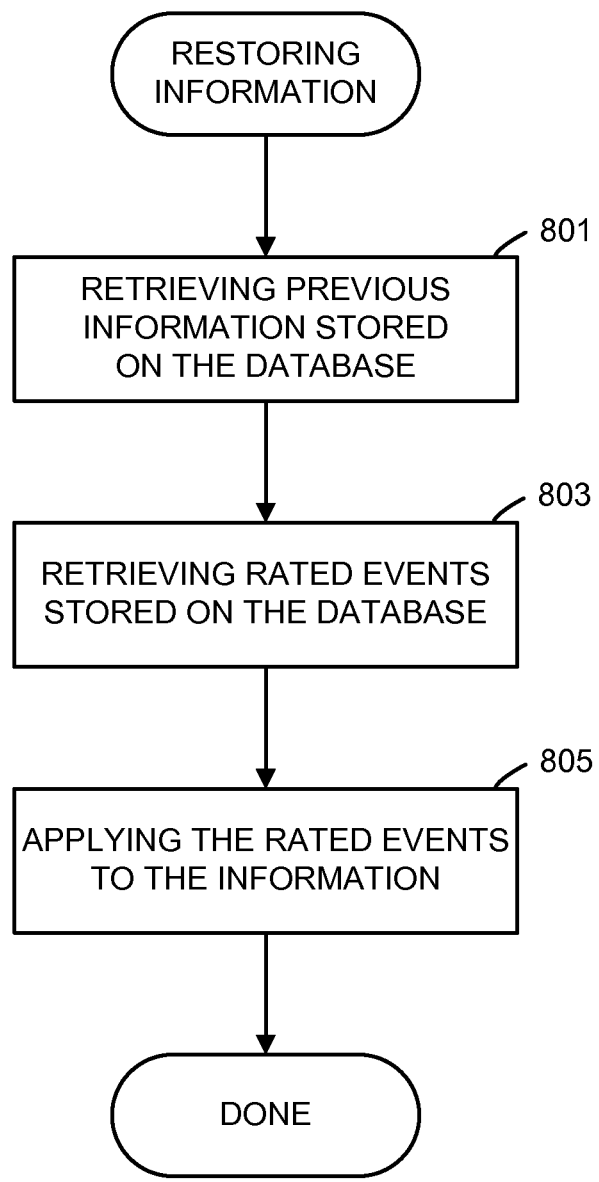
FIG. 9 shows a flow chart of a process of restoring information that utilizes previously stored information and rated events.

The rated events that are stored on the database system can also be utilized to restore information that is stored locally on the rating system. FIG. 9 shows a flow chart of a process of restoring information to a rating system utilizing previously stored information from a database and rated events on the database. An example of when this process could be utilized is when the computer system implementing the rating system crashes and the rating system needs to be brought back online.

At a step 801, information previously stored on the database is retrieved. Depending on the implementation, the information stored on the database may be almost up to date or it may be stale. In order to bring the information up-to-date, the rating system also retrieves rated events that are stored on the database system at a step 803. The rated events include information specifying how the information that is stored on the database has changed as a result of events that where subsequently received.

The rated events are applied to the information from the database at a step 805. By applying the rated events to the previously stored information, the information stored in the database is restored to its current state. Thus, by retrieving the information previously stored on the database and the rated events on the database, the rating system is able to restore the current information. Not only is the process efficient, it does not require the storage of a redo log that tracks each change to the database.

It may be beneficial to describe an example of restoring information according to the flow chart shown in FIG. 9. Going back to the example where a service provider is providing cellular time to customers, the rated events can result in, among other things, changes to a customer's balance.

If it is desired to restore the information on the rating system, the previously stored balance for the customer may be retrieved from the database system. Additionally, any subsequent rated events that effected this customer's information may be retrieved. The rated events that are retrieved are then applied to the information, where they may update the balance to the current amount.

Figure 10:
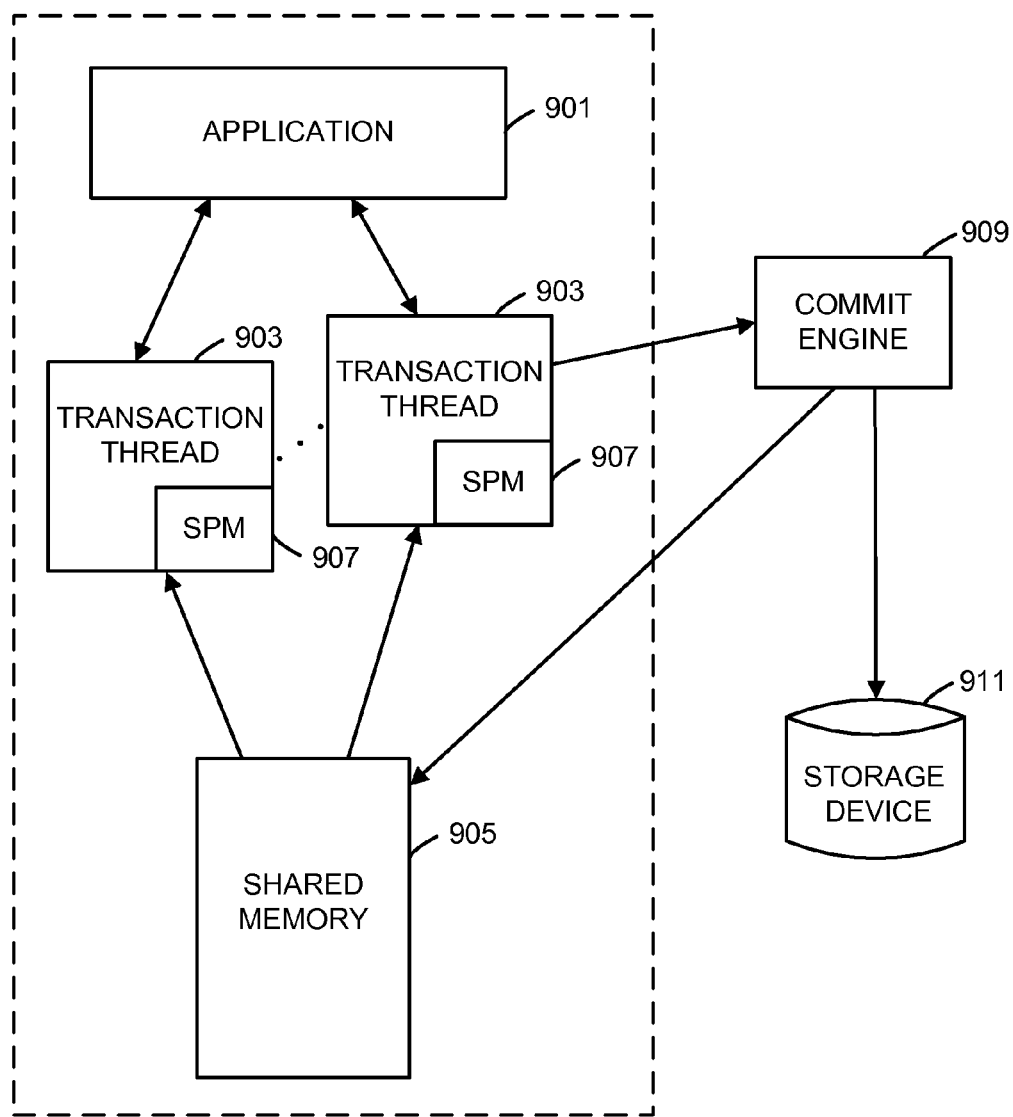
FIG. 10 shows a transactional real time event processing system including shared memory of an in-memory database.

The above has described rating of events, the invention can also provides innovative techniques of committing processed events. FIG. 10 shows a transactional real time event processing system. An application 901 interacts with transaction threads (or processes, contexts, objects, etc.) 903. For example, application can be a business billing application that interacts with transaction threads 903 through application programming interface (API) calls.

Each transaction thread 903 is executing computer code to process an event and can include a rating engine as described above. Transaction threads 903 have read-only access to a shared memory 905 of an in-memory database. When initializing shared memory, conventional operating systems allow the read/write privileges that are granted to be specified.

Shared memory 905 can store, among other things, customer information and A/R (e.g., information for determining if a transaction is allowed, rating transactions and balances). By giving transaction threads 903 read-only access to shared memory 905, "dirty" reads can be avoided where data can be read from shared memory before it has been committed. This will be described in more detail in the following paragraphs.

As transaction threads 903 have read-only access to shared memory 903, the transaction threads store changes that are made to the shared memory in scratch pad (local) memory 907. When a transaction thread is ready to commit a processed event, information is sent to a commit engine 909.

Commit engine 909 updates the shared memory according to the processed event and can log the processed event to a storage device 911. The log on storage device 911 can serve for failure or disaster recovery.

Since transaction threads 903 do not have write access to shared memory 905, the transaction threads do not have access to any updates to the shared memory until after the update has been committed through commit engine 909. This remedies the dirty read problem of many conventional systems.

Additionally, transaction threads 903 can provide APIs for application 901 to access shared memory 905. This can be especially beneficial if application 901, transaction threads 903 and shared memory 905 are in the same address space (see dashed lines). By being in the same address space, application 901 can access data in shared memory 905 directly, without requiring a copy of the data being made and sent.

Figure 11:
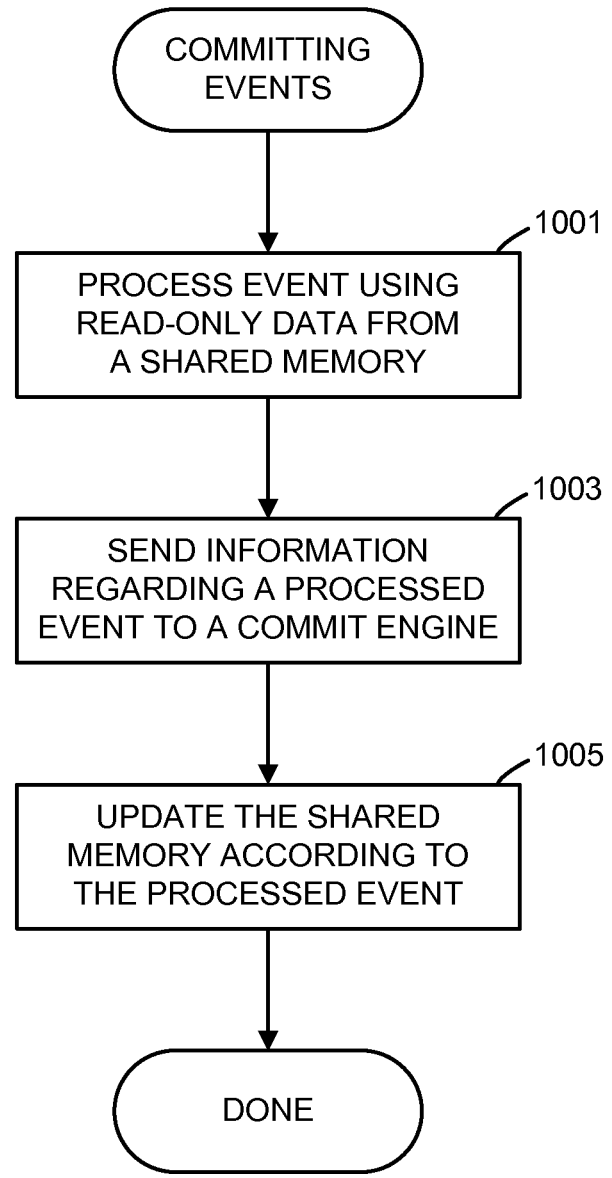
FIG. 11 shows a flow chart of a process of committing events where transaction threads have read-only access to shared memory.

FIG. 11 shows a flow chart of a process of committing events where transaction threads have read-only access to shared memory. At a step 1001, one or more transaction threads process events utilizing read-only data from a shared memory of an in-memory database. The processing can include rating an event.

At a step 1003, the one or more transaction threads send information regarding a processed event to a commit engine. For example, a transaction thread can send the processed event and data from scratch pad memory 907.

The commit engine updates the shared memory according to the processed event at a step 1005. Additionally, the commit engine can store a log of the event in a storage device. In some embodiments, the processed event and local memory are logged on a storage device. Updates to the shared memory of the in-memory database are then made according to the processed event. Lastly, events are extracted from the log and stored in another database.

Figure 12:
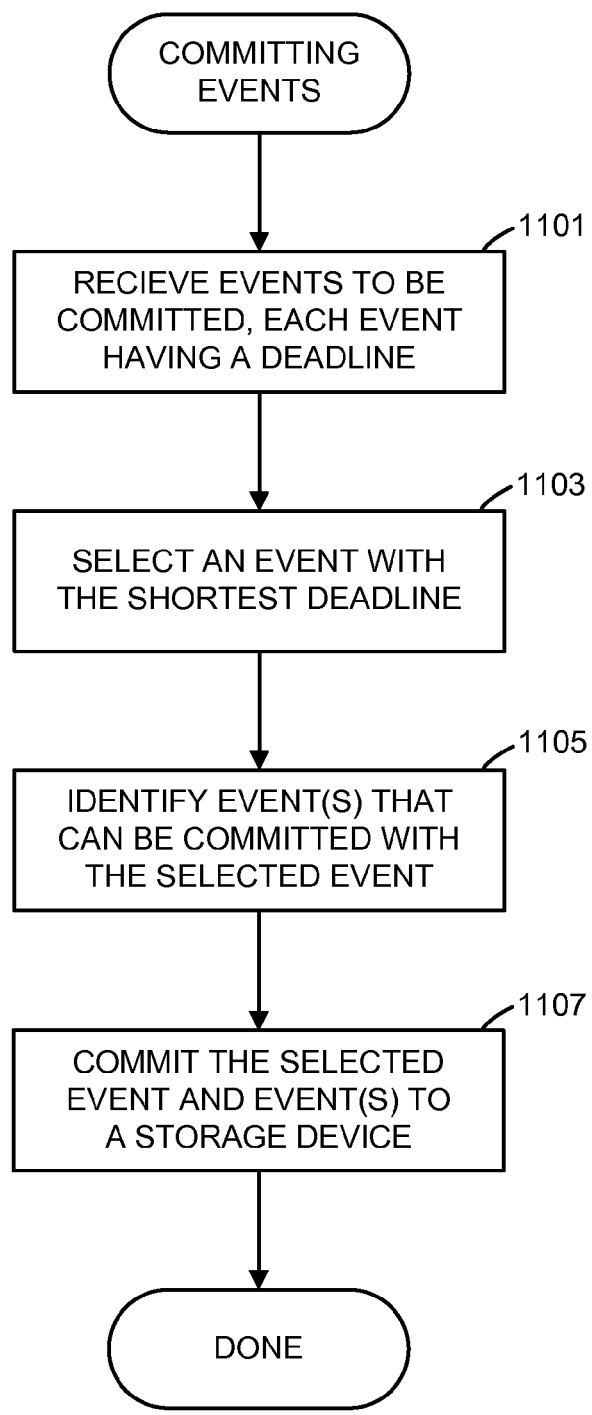
FIG. 12 shows a flow chart of a process of committing events where events have associated deadlines for committing.

The way in which events are committed can have a large impact on the efficiency of the system. FIG. 12 shows a flow chart of a process of committing events where events have associated deadlines for committing. The deadlines specify an amount of time that can elapse before the event should be committed. The event can be committed at any time before the deadline, but the deadline should or must not be missed.

At a step 1101, events to be committed are received where each event has a deadline. Some events may need to be committed relatively fast (e.g., milliseconds) and others may have longer deadlines. Events that do not have an associated deadline can still be committed in timely manner as will be described below.

An event with the shortest deadline is selected at a step 1103. The commit engine may be continually committing events. Thus, if there are no events with deadlines waiting to be committed, an event without a deadline can be selected (e.g., longest waiting to be committed). In some embodiments, the events are sorted by deadlines in order to facilitate selecting the event with the shortest deadline.

At a step 1105, one or more events are identified that can be committed with the selected event. Although the commit engine could commit one event at a time, it can be more efficient to commit multiple events at a time. The efficiency of committing multiple events can be analyzed to determine how many additional events to commit with the selected event. For example, any one or more of factors such as the speed of the storage device, size of the events, maximum size for committing, maximum delay time for committing, preprocessing overhead time for the commit, postprocessing overhead time for the commit, or the like.

At a step 1107, the selected event and the one or more events identified at step 1105 are committed. As an example, assume that the events are sorted and the event with the shortest deadline is selected. The commit engine could determine that the next five events (with or without deadlines) could be efficiently committed with the selected event (e.g., disk drives can often perform additional writes much more efficiently than sequential single writes). In other words, committing these six events would be more efficient than committing just the selected event and still allow deadlines on existing and future events to be met. Accordingly, the six events would be committed together.

As can be seen, the invention allows for very efficient ratings and committing of events while also maintaining the integrity of the information. Additionally, the storage and retrieval of the information can also be improved utilizing embodiments of the invention.

While the above has described specific embodiments of the invention, various alternatives and modifications can be made to the embodiments described above. However, these alternatives and modifications are not outside the scope of the invention which is defined by the following claims along with their fair scope of equivalents.

What is claimed is:

1. A method comprising:
   executing, by a computer system, a plurality of threads in parallel, each thread processing an event in real-time, each event pertaining to a customer transaction related to use of a cellular phone;
   accessing, by the computer system, read-only data from a database, the read-only data comprising information needed to rate the customer transaction to which the event pertains;
   storing, by the computer system, the accessed read-only data from the database in a local memory of the computer system;
   processing the event, by the computer system, using the stored read-only data from the database, wherein the processing comprises rating the event based on the use of the cellular phone; and
   sending, by the computer system, information regarding the processed event to a commit engine, wherein the commit engine is configured to update the database according to the processed event and store updates from the processed event to the local memory of the computer system, the updates from the processed event to the local memory comprising data for determining whether the customer transaction is allowed including at least data for rating the customer transaction and data determining a customer account balance.

2. The method of claim 1 wherein sending the information regarding the processed event to the commit engine comprises accessing the information from the memory for the thread local by a rating engine.

3. The method of claim 1 wherein the computer system is configured to execute the plurality of threads in the context of a business application.

4. The method of claim 1 wherein the plurality of threads do not have write access to the database.

5. A non-transitory computer readable medium comprising a set of instructions stored therein which, when executed by a computer system, causes the computer system to:
- execute a plurality of threads in parallel, each thread processing an event in real-time, each event pertaining to a customer transaction related to use of a cellular phone;
- access read-only data from a database, the read-only data comprising information needed to rate the customer transaction to which the event pertains;
- store the accessed read-only data from the database in a local memory of the computer system;
- process the event by a rating engine using the stored read-only data from the database, wherein the processing comprises rating the event based on the use of the cellular phone; and
- send information regarding the processed event to a commit engine, wherein the commit engine is configured to update the database according to the processed and store updates from the processed event to the local memory of the computer system, the updates from the processed event to the local memory comprising data for determining whether the customer transaction is allowed including at least data for rating the customer transaction and data determining a customer account balance.

6. The non-transitory computer readable medium of claim 5 wherein sending the information regarding the processed event to the commit engine comprises accessing the information from the memory for the thread local to the rating engine.

7. The non-transitory computer readable medium of claim 5 wherein the computer system is configured to execute the plurality of threads in the context of a business application.

8. The non-transitory computer readable medium of claim 5 wherein the plurality of threads do not have write access to the database.

9. A system comprising:
a processor; and
a memory coupled with and readable by the processor and storing therein a set of instructions which, when executed by the processor, causes the processor to:
- execute a plurality of threads in parallel, each thread processing an event in real-time, each event pertaining to a customer transaction related to use of a cellular phone;
- access read-only data from a database, the read-only data comprising information needed to rate the customer transaction to which the event pertains;
- store the accessed read-only data from the database in a local memory of the computer system;
- process the event by a rating engine using the stored read-only data from the database, wherein the processing comprises rating the event based on the use of the cellular phone; and
- send information regarding the processed event to a commit engine, wherein the commit engine is configured to update the database according to the processed event and store updates from the processed event to the local memory of the computer system, the updates from the processed event to the local memory comprising data for determining whether the customer transaction is allowed including at least data for rating the customer transaction and data determining a customer account balance.

10. The system of claim 9 wherein the commit engine and the database are external to the system.

11. The system of claim 9 wherein the plurality of threads do not have write access to the database.

* * * * *

UNITED STATES PATENT AND TRADEMARK OFFICE
CERTIFICATE OF CORRECTION

| | |
|---|---|
| PATENT NO. | : 8,856,178 B2 |
| APPLICATION NO. | : 13/303504 |
| DATED | : October 7, 2014 |
| INVENTOR(S) | : Labuda et al. |

Page 1 of 1

It is certified that error appears in the above-identified patent and that said Letters Patent is hereby corrected as shown below:

Title Page Item (56)

On page 3, column 2, under Other Publications, line 27, delete "Millenium" and insert -- Millennium --, therefor.

On page 3, column 2, under Other Publications, line 35, delete "Millenium" and insert -- Millennium --, therefor.

On page 4, column 1, under Other Publications, line 22, delete "Millenium" and insert -- Millennium --, therefor.

In the Drawings

On sheet 12 of 12, in figure 12, under Reference Numeral 1101, delete "RECIEVE" and insert -- RECEIVE --, therefor.

In the Specification

In column 3, line 61, after "shows" delete "a".

In column 3, line 64, after "houses" insert -- a --.

In column 4, line 4, delete "system, memory" and insert -- system memory --, therefor.

Signed and Sealed this
Fourth Day of August, 2015

Michelle K. Lee
*Director of the United States Patent and Trademark Office*